United States Patent [19]

Wilkie

[11] Patent Number: 5,792,549
[45] Date of Patent: Aug. 11, 1998

[54] BIAXIALLY ORIENTED POLYPROPYLENE COLD SEAL RELEASE FILMS

[75] Inventor: Andrew F. Wilkie, Havermill, Mass.

[73] Assignee: AEP Industries, Inc., South Hackensack, N.J.

[21] Appl. No.: 655,542

[22] Filed: May 30, 1996

[51] Int. Cl.⁶ .................. B32B 7/12; B32B 21/32
[52] U.S. Cl. .................. 428/215; 428/352; 428/354; 428/516
[58] Field of Search .................. 428/343, 345, 428/349, 352, 354, 332, 335, 336, 515, 516, 215; 525/240, 244, 242

[56] References Cited

U.S. PATENT DOCUMENTS

| | | | |
|---|---|---|---|
| 4,125,662 | 11/1978 | Weiner et al. | 428/213 |
| 4,230,767 | 10/1980 | Isaka et al. | 428/349 |
| 4,293,608 | 10/1981 | Isaka et al. | 428/220 |
| 4,316,970 | 2/1982 | Hughes | 525/240 |
| 4,357,383 | 11/1982 | Howden et al. | 428/214 |
| 4,367,312 | 1/1983 | Bontinck et al. | 525/93 |
| 4,647,509 | 3/1987 | Wallace et al. | 428/474.9 |
| 4,673,601 | 6/1987 | Lamping et al. | 428/35 |
| 4,692,380 | 9/1987 | Reid | 428/349 |
| 4,741,950 | 5/1988 | Liu et al. | 428/315.5 |
| 4,758,396 | 7/1988 | Crass et al. | 264/145 |
| 4,777,081 | 10/1988 | Crass et al. | 428/215 |
| 4,883,698 | 11/1989 | Bothe et al. | 428/359 |
| 4,888,237 | 12/1989 | Balloni et al. | 428/347 |
| 4,944,990 | 7/1990 | Liu et al. | 428/353 |
| 4,996,096 | 2/1991 | Dew | 428/216 |
| 4,997,700 | 3/1991 | Bothe et al. | 428/216 |
| 5,026,592 | 6/1991 | Janocha et al. | 428/204 |
| 5,085,927 | 2/1992 | Dohrer | 428/220 |
| 5,091,236 | 2/1992 | Keller et al. | 428/213 |
| 5,112,674 | 5/1992 | German et al. | 428/216 |
| 5,125,946 | 6/1992 | Bhagavatula | 65/106 |
| 5,134,173 | 7/1992 | Joesten et al. | 521/139 |
| 5,137,785 | 8/1992 | Suzuki et al. | 428/411.1 |
| 5,176,954 | 1/1993 | Keller et al. | 428/317.9 |
| 5,194,318 | 3/1993 | Migliorini et al. | 428/215 |
| 5,209,884 | 5/1993 | Wood, Jr. | 264/41 |
| 5,318,824 | 6/1994 | Itaya et al. | 428/178 |
| 5,318,834 | 6/1994 | Foulkes et al. | 428/304.4 |
| 5,326,625 | 7/1994 | Schuhmann et al. | 428/215 |
| 5,328,734 | 7/1994 | Morese-Seguela et al. | 428/36.92 |
| 5,364,704 | 11/1994 | Murschall et al. | 428/516 |
| 5,366,796 | 11/1994 | Murschall et al. | 428/216 |
| 5,385,998 | 1/1995 | Kohyama et al. | 526/348.6 |
| 5,425,996 | 6/1995 | Wilkie et al. | 428/461 |
| 5,482,780 | 1/1996 | Wilkie et al. | 428/515 |
| 5,489,473 | 2/1996 | Wilkie | 428/323 |

OTHER PUBLICATIONS

Spec. sheet for Biaxially Oriented Polypropylene Film (BOPP), TORAYFAN, Aug. 1, 1992, 2 pages.

*Primary Examiner*—Paul J. Thibodeau
*Assistant Examiner*—D. Lawrence Tarazano
*Attorney, Agent, or Firm*—Mathews, Collins, Shepherd & Gould, P.A.

[57] ABSTRACT

A coextruded biaxially oriented polyolefin packaging film has a cold seal release layer, a core layer, and a cold seal receptive skin layer. The cold seal release layer is fabricated of about 1% to about 80% by weight polyolefin polymer selected from isotactic homopolymer polypropylene, syndiotactic homopolymer polypropylene, homopolymer polyethylene, ethylene-alpha-olefin copolymers made by metallocene catalysis, e.g. ethylene-butylene (plastomers), blends of plastomers with syndiotactic homopolymer polypropylene, blends of syndiotactic homopolymer polypropylene with ethylene-propylene random copolymer, and mixtures thereof. In addition, the release layer contains from about 20% to about 99% by weight polybutylene-polyethylene copolymer containing between about 0.5% and about 6.0% by weight ethylene and between about 94% and about 99.5% by weight butylene, and optionally an effective amount of non-migratory slip agent. Other films are provided which are made of 1% to 80% by weight of a polymer selected from ethylene-alpha olefin copolymers made by metallocene catalysis, e.g. ethylene-butene (plastomers), and ethylene-propylene random copolymers, and 20% to 99% by weight of syndiotactic polypropylene. The packaging films exhibit excellent cold seal release and coefficient of friction properties without using migratory slip additives or an overprint varnish.

21 Claims, No Drawings

1

BIAXIALLY ORIENTED POLYPROPYLENE COLD SEAL RELEASE FILMS

FIELD OF THE INVENTION

The present invention relates to single web or composite, oriented polyolefin, preferably polypropylene, films which are useful as cold seal release films. More specifically, the present invention relates to composite, oriented polypropylene films which provide excellent cold seal release properties without relying on migratory slip and antiblock additives and without the need to treat an opposing polymeric film surface.

BACKGROUND OF THE INVENTION

Cold seal cohesives are generally natural or synthetic rubber latex compositions which, when applied to a flexible packaging substrate, allow the package to be cohesively sealed by pressure and dwell time at ambient temperature. Cold seal latex cohesives are particularly useful in wrapping products which are heat sensitive, such as confectioneries.

Flexible cold seal packaging laminates for confectioneries are known. Configurations for such laminates comprise an outer web constructed of 50 to 100 gauge biaxially oriented polypropylene (BOPP) film having a slip and antiblock modified cold seal release layer formed thereon. Reverse printed ink may then be applied to the BOPP film surface opposite the release layer, and a laminating adhesive or polyethylene extrusion is typically applied between the outer web and an inner web. The inner web typically comprises a cold seal receptive BOPP or polyethylene terephthalate (PET) metallized, clear or opaque white film having a thickness of from 32 to 150 gauge. A cold seal latex cohesive is applied in a registered pattern onto the exposed surface of the inner web.

Flexible single web cold seal packaging configurations for confectioneries are also known. Single web configurations comprise a 50 to 150 gauge cold seal receptive BOPP or PET metallized, clear or white opaque film having surface printed ink applied to one side thereof. A cold seal latex cohesive is applied in a registered pattern to an opposite side thereof. An outer surface is formed over the surface printed ink and comprises an overprint, varnish and/or overlacquer.

For the aforementioned configurations and others, cold seal cohesives are generally applied to the inside (cold seal receptive surface) of a film lamination or to a single web film. In each case, the outer film surface (facing away from the cold seal) must repel adhesion to the cold seal on the inner web so that the roll stock may be unwound when it is used to wrap a product. In the case of a single web film, the surface opposing the cold seal cohesive is typically coated with a polyamide type overlacquer to provide sufficient release from the cold seal, i.e., to prevent roll blocking.

In the case of laminated films, the outer web of the film is generally modified with migratory additives which, when sufficiently bloomed to the surface, promote a low coefficient of friction (COF) for machinability, resulting in good cold seal release (CSR) properties. It is known that migratory additives, particularly amides, coming in intimate contact with the cold seal composition surface in sufficient quantities will cause the cohesive strength of the cold seal composition to become significantly weakened. This phenomenon is known as cold seal deadening.

Biaxially oriented polypropylene film (BOPP film) by itself does not give adequate cold seal release or coefficient of friction and requires additives to accomplish these objectives. Such additives, which are predominantly migratory, have two main problems: (1) they must bloom to the film surface and remain there to be consistently effective; and (2) they have a tendency to retard the cold seal cohesive strength. The current industry standard film for such an application is a monolayer BOPP homopolymer film modified with an amide additive, for example films B522 and B523 available from Applied Extrusion Technology, Inc. In the case of B523, the slip modified film is corona discharge treated to an equal level on both surfaces and, as such, can be used on either side. In the case of B522, the film is corona discharge treated on only one surface. The untreated surface is the preferred surface for cold seal release.

While some good results can be achieved for certain applications with these films, they must be aged for a period of time after production and at a certain temperature so that the cold seal release and coefficient of friction additives have adequate time to sufficiently bloom to the surface. If conditions are such that the additives are not allowed to sufficiently bloom, the film is rendered non-functional.

A need therefor exists for a polypropylene packaging film formulation which provides good cold seal release without the need for migratory slip and antiblock additives.

A solution to the problems of migratory slip and antiblock additives was provided in the commonly owned U.S. Pat. Nos. 5,482,780 and 5,489,473, which are incorporated herein, in their entirety, by reference. U.S. Pat. Nos. 5,482,780 and 5,489,473 disclose coextruded biaxially oriented polypropylene packaging films which include a cold seal release layer. The release layer of the films of U.S. Pat. No. 5,482,780 comprises a blend of (a) about 25% to 80% by weight of an ethylene-propylene random copolymer containing about 2% to about 8% of ethylene (b) 20% to 75% by weight of an ethylene-butylene copolymer containing about 0.5% to 6% by weight ethylene and about 94% to 99.5% of butylene, and (c) a non-migratory slip agent in an amount sufficient to decrease the coefficient of friction of the release layer. The release layer of the films of U.S. Pat. No. 5,489,473 comprises 50% to 80% component (a) wherein component (a) has an ethylene content of from 2 to 6 weight percent, and comprises 20% to 50% by weight component (b) wherein component (b) has an ethylene content of about 0.5% to 2.5% by weight.

Among the many attributes of the films of these U.S. Patents, they have good to excellent coefficient of friction when the films, with or without the cold seal composition, are unwound from a roll. The films also provide good to excellent adhesion of a cold seal composition on the respective cold seal receptive surface.

The films disclosed in U.S. Pat. Nos. 5,482,780 and 5,489,473 are limited to those having a cold seal release layer which comprises an ethylene-propylene random copolymer as a major ingredient. Many other polymer films may be used, however, in the packaging industry and provide different advantages depending upon the desired application. For example, some polymers can be used to form a film having a better matte finish appearance compared to films made of ethylene-propylene random copolymers. Other different optical properties can alternatively be achieved depending upon the polymers used as major ingredients in the packaging film. Some applications require a matte finish while others require low haze and high gloss. Some films must be receptive to printing inks while others do not require this characteristic.

A need therefor exists for a variety of packaging films which contain polymers other than ethylene-propylene random copolymers as major ingredients.

SUMMARY OF THE INVENTION

The present invention is based upon the discovery of new polypropylene film formulations which can be reverse printed and pattern cold seal coated on a cold seal receptive surface thereof and released from an opposing surface without the need for a cold seal release overprint varnish or migratory slip additives.

The invention relates to single or dual web polypropylene films or multilayer packaging films which can be reverse printed and/or pattern cold seal coated on the cold seal receptive surface yet be releasable from an opposing film surface without the need for a cold seal release overprint varnish and/or migratory slip agents which deaden the cold seal composition. This eliminates a step in the converting process as well as reduces the overall production costs. In another embodiment a packaging film is made possible by providing a polymeric film surface on one side of a core which film surface gives excellent cold seal release without relying on conventional migratory slip and antiblock additives, and providing a surface treated polymeric film layer on the other side of the core which enables excellent adhesion of a cold seal cohesive composition.

The films of the present invention demonstrate:

A. Good to excellent coefficient of friction when the film is unwound from a roll, with or without the cold seal cohesive composition present;

B. Good to excellent adhesion of the cold seal composition on the cold seal receptive surface;

C. A range and choice of optical properties;

D. Good printability on the cold seal receptive surface;

E. Good machinability and stiffness typical of oriented polypropylene film; and

F. An absence of deadening of the cold seal cohesive properties.

The films of the present invention have the following principal advantages over the prior art:

1. Immediate and permanent release of the cold seal receptive surface as well as the cold seal composition from the surface of the cold seal release layer on the opposing side of the film at the time of manufacture and roll winding. Thus, no film aging is required and therefore the conventional overprint varnish for single web polypropylene films is not required. Elimination of the aging and overprint varnish saves on time and costs.

2. Permanently good cold seal receptivity on the cold seal receptive surface.

3. Permanently low coefficient of friction on unwinding a roll of film due to the absence of migratory slip additives.

4. No cold seal cohesive deadening because it does not possess migratory additives in type or quantity to do so.

5. The cold seal release surface will readily accept code dating inks.

The aforementioned properties and advantages are achieved in one embodiment according to the present invention by providing a coextruded biaxially oriented polyolefin packaging film comprising a core layer having a cold seal release layer formed on one side thereof and a cold seal receptive skin layer formed on the opposite side thereof, wherein the cold seal release layer comprises: (A) about 1% to about 80% by weight polymer selected from the group consisting of isotactic homopolymer polypropylene, syndiotactic homopolymer polypropylene, polyethylene, ethylene-alpha olefin copolymers made by metallocene catalysis, e.g. ethylene-butylene (plastomers), blends of plastomers with syndiotactic homopolymer polypropylene, and blends of syndiotactic homopolymer polypropylene with ethylene-propylene random copolymer; (B) about 20% to about 99% by weight polymer selected from the group consisting of polybutylene-polyethylene copolymers containing between about 0.5% and about 6.0% by weight ethylene and between about 94% and about 99.5% by weight butylene; and optionally (C) a non-migratory slip agent present in an amount sufficient to decrease the coefficient of friction of the release layer. These cold seal release layer formulations, when formed on a polyolefin core layer, provide cold seal cohesive packaging films having excellent combinations of properties.

Alternatively, component (B) can be eliminated altogether from some formulations of the present invention if component (A) comprises either a blend of plastomer and syndiotactic polypropylene or a blend of syndiotactic polypropylene and ethylene-propylene random copolymer. If either of these blends is used as component (A), the component may comprise up to 100% by weight of the cold seal release layer, with only minor variations of the 100% being attributed to additives such as non-migratory slip agents.

In another aspect of the present invention the cold seal receptive layer of the film is coated with a cold seal cohesive composition.

In yet another aspect according to the present invention the film having a cold seal cohesive composition is used for wrapping items such as confectioneries.

DETAILED DESCRIPTION OF THE INVENTION

THE COLD SEAL RELEASE LAYER

In accordance with the present invention, I have discovered that the ethylene-propylene random copolymer ingredient in the cold seal release layers of U.S. Pat. Nos. 5,482,780 and 5,489,473 can be replaced with other selected polyolefins to achieve superior results when compared to current state of the art non-corona treated homopolymer polypropylene surfaces. According to the invention, an ethylene-butylene copolymer having an ethylene content of between about 0.5% and about 6.0% by weight is blended with one or more polymers which are alternatives to the ethylene-propylene copolymers of the previously mentioned U.S. Pat. Nos. 5,482,780 and 5,489,473.

The alternative polymers are those selected from the group consisting of isotactic homopolymer polypropylene, syndiotactic homopolymer polypropylene, polyethylene, ethylene-alpha olefin copolymers made by metallocene catalysis, e.g. ethylene-butylene or ethylene-hexene or ethylene-octene (plastomers), blends of plastomers with syndiotactic homopolymer polypropylene, blends of syndiotactic homopolymer polypropylene with ethylene-propylene random copolymer, and mixtures thereof. Examples of suitable polyethylenes for use as an alternative polymer are ultra low density polyethylene (ULDPE), very low density polyethylene (VLDPE), linear low density polyethylene (LLDPE), medium density polyethylene (MDPE), and high density polyethylene (HDPE) including, but not limited to, polyethylenes having densities in the range of from 0.91 to 0.965 gm/cm$^3$. Preferred polyethylenes include linear low density polyethylene and high density polyethylene. Preferably, the release surfaces containing these alternative polymers are non-corona treated according to the invention.

According to another embodiment of the invention, the use of an ethylene-butylene copolymer (component (B)) can be eliminated altogether if component (A) comprises either a blend of plastomer and syndiotactic polypropylene or a blend of syndiotactic polypropylene and ethylene-propylene random copolymer. If either of these blends is used as component (A), the component may comprise up to 100% by weight of the cold seal release layer, with only minor variations of the 100% being attributed to additives such as non-migratory slip agents. When such blends are used for the cold seal release layer, surprisingly beneficial properties can be achieved without the need for the butylene-containing ethylene-butylene copolymer.

The cold seal release layer comprises the low ethylene content polybutylene copolymer at 20% to 99% by weight of such layer, preferably at 20% to 50% by weight, and more preferably at 40% by weight. Such copolymer is melt blended with one of the alternative polymers mentioned above. The "alternative" polymers or polymer combinations are employed at 1% to 80% by weight of such layer, preferably at 50% to 80% by weight, and more preferably at 60% by weight. The ethylene content in the ethylene-butylene copolymer is preferably about 0.5% to about 6% by weight and particularly about 0.5% to 2.5% by weight. According to a preferred embodiment of the invention, the ethylene content of the ethylene-butylene copolymer is 0.5% by weight.

The inventive combination of polymers surprisingly provides significantly better cold seal release (with or without corona treatment) than the release obtained using homopolymer polypropylene or ethylene-propylene random copolymers which do not contain surface migratory additives. Corona discharge treating the cold seal release surface of the present film substantially diminishes the heat sealing temperature use range, however, the cold seal release properties remain excellent. By "heat seal" herein is meant temperatures generally in excess of 150° F. For many packaging operations, such temperatures are unacceptable.

The film-to-film and film-to-metal coefficient of friction of the release surface of the polymers used in the present invention are moderately high and can benefit from the addition of a non-migratory slip agent in an amount sufficient to decrease the coefficient of friction of the release layer to about 0.2 to 0.4. The weight quantity of such slip agent in the release layer is generally about 0.01% to about 1% by weight. Such non-migratory slip agents useful herein can include various inorganics such as talcs, silicas—particularly syloids (micron sized silicas), glass beads, diatomaceous earth, clay and the like. A preferred non-migrating slip agent is from about 1,000 to 10,000 ppm by weight of a cross-linked silicone having a particle size of about 1 to 4.5 microns such as that of TOSPEARL of Toshiba Company. Non-migratory slip agents are preferably used in amounts of only up to about 2% by weight based on the weight of the cold seal release layer, particularly in the range of from about 1000 ppm to about 2000 ppm.

To further enhance slip and release properties of the film, relatively minor amounts of migratory slip/anti-block and anti-static agents, such as amides, stearates and amines can optionally be added to the skin and/or core layers to facilitate the main film functions. Such agents can be used in quantities of about 0 to about 1.0% by weight and preferably from about 0.05% to about 0.5% by weight of such layer. The use of these additives, however, is limited by the propensity to deaden the cold seal composition in the end use application.

THE CORE LAYER

The core layer of the films of the present invention is predominantly isotactic polypropylene homopolymer. It can include small quantities, e.g., less than about 10%, e.g., 2% to 8% of other polymers such as alpha-olefin polymers having about 2 to 4 carbon atoms, e.g., ethylene-propylene random copolymer, ethylene-propylene block copolymer and polyethylenes having densities of from about 0.91 to about 0.965 gm/cm³. If a high density polyethylene is used, the quantity is generally limited to less than 5% by weight, such as about 0.5% to 4.5% by weight. Preferably not more than about 4% of such other polymers are included in the core so as not to adversely effect the stiffness, clarity and other physical properties of the oriented polypropylene. Optionally, small quantities of migratory additives can be included in the core layer such as amides, including erucamide, behenamide or glycerol monostearate, or amines. Other inorganics such as, calcium stearate, or silicone oil can also be added to the core layer, but these are often more useful when used within the release skin layer. The thickness of the core layer can vary widely between about 40 to about 150 gauge, about 50 to about 70 gauge being preferred.

THE COLD SEAL RECEPTIVE LAYER

The cold seal receptive layer is preferably from about 1 to 10 gauge in thickness and is fabricated of ethylene-propylene random copolymer containing about 2% to about 8% by weight ethylene and about 92% to about 98% by weight propylene. Preferably, the receptive layer contains from 3% to 5% by weight ethylene and from 95% to 98% by weight propylene. The surface of the cold seal receptive layer is subjected to a physical surface-modifying treatment to improve the bond between that surface and the subsequently applied cold seal composition. A preferred treatment is to subject the exposed surface of such layer to a high voltage electrical stress accompanied by corona discharge. Other such surface modifying treatments include flame treatment of the surface of such layer or any combination of flame and corona treatments.

The cold seal receptive skin layer can optionally also contain an adhesion promoting agent to improve adhesion to the cold seal composition. Such adhesion promoters include powdered polyamides, e.g., Nylon 6, clay, random alpha-olefin copolymers of 1 to 4 carbon atoms as well as polar polymers such as those containing acrylic or methacrylic acid in a quantity sufficient to enhance adhesion of the cold seal composition to the treated skin surface.

Films of the present invention exhibit excellent cold seal release to commercially applied cold seal compositions. Release is immediate from the date of manufacture, without aging, and remains permanent and consistent through aging. Unlike prior art film, no additive migration is necessary to achieve desired release. In fact, migratory release additives are not required in the present cold seal invention, but are preferred. Additionally, good anti-block to reverse printing inks and good ink adhesion and lamination bond strengths on print or laminating surfaces are obtained by the present invention. In addition, according to the present invention, minimal to zero cold seal deadening in the final film is observed.

Manufacture of the polyolefin film according to this invention is carried out by known processes such as coextrusion of the various layers. This includes coextruding through a flat film die the melt corresponding to the individual polymeric layers of the film, cooling the film obtained by coextrusion in order to harden it, orienting, e.g., biaxially stretching, the film, heat-setting the stretched film and surface modifying the surface, e.g., corona treating the cold seal receptive layer and optionally surface treating the release layer such as when it is desired to print thereon. The film can also be coextruded by the blown film or double bubble orientation process.

The composite film structure comprising the core and adherent cold seal release and cold seal receptive skins is stretched by conventional techniques to orient the film, prior to surface treatment such as by corona discharge. Orientation may be effected uniaxially, by stretching the film in one direction, or biaxially, by stretching the film in each of two mutually perpendicular directions in the plane of the film. Biaxial orientation is preferred.

The degree to which the film is stretched depends to some extent on the ultimate use for which the film is intended. Preferably, the film is stretched to between about 4 and about 6.5 times its original dimension in the longitudinal direction and to between about 5 and about 10 times in the transverse direction. The longitudinal stretching is expeditiously carried out with the aid of two rolls running at different speeds according to the stretch ratio desired and the transverse stretching with the aid of a corresponding tenter frame. Migratory additives in the core layer are preferred in small amounts to assist in high speed stretching and machinability of the film surface.

After stretching, the polymeric film is normally "heat set", while restrained against shrinkage at a temperature above the glass transition temperature of the polymer and below its melting point.

Prior to application of the cold seal cohesive onto the exposed surface of the cold seal receptive layer, such layer is subjected to a physical surface-modifying treatment to improve the bond between that surface and the subsequently applied cold seal cohesive. A preferred treatment is to subject the exposed surface to a high voltage electrical stress accompanied by corona discharge. The surface modification may instead include flame treatment or any combination of flame and corona treatments. The film is then heat aged to impart further dimensional stability to the film. In case the release layer of the film on the other side of the core is to be printed, the surface of such layer is also modified by corona discharge or flame treatment.

The thickness of the composite film of the present invention can vary over a wide range but is most preferably from about 50 to about 150 gauge.

The cold sealing process of the present invention is preferably achieved at a temperature of less than 150° F., and more preferably at a temperature range of from 65 F. to 85° F. In the cold sealing process of the present invention, the films of the invention are subjected to a sufficient pressure for a sufficient time to achieve the desired cold seal. The time needed for pressure application to achieve cold sealing can be from 0.1 to 1 second, depending upon the cohesive used, the amount of pressure applied, and other factors. This range of times, however, should not be construed as a limitation of the present invention. In one embodiment, the cold seal pressure can be from about 20 to 100 psi, and more preferably is from 70 to 90 psi.

The resulting cold seal release of the present invention preferably exhibit a release force of from about zero to about 75 grams/inch, with the range of 5 to 50 grams per inch being preferred.

DETAILED DESCRIPTION OF PREFERRED EMBODIMENTS

One preferred biaxially oriented polypropylene cold seal release film manufactured in accordance with the present invention has the following composition:

COLD SEAL RELEASE LAYER—(3.5 gauge thickness)

Polymer (A)—about 60% by weight polymer selected from the group consisting of linear low density polyethylene, isotactic homopolymer polypropylene, syndiotactic homopolymer polypropylene, linear ethylene-butylene copolymer plastomers, and high density polyethylene.

Polymer (B)—about 40% by weight ethylene-butylene random copolymer having an ethylene content of 0.5% by weight.

Additives: 3,000 ppm high density polyethylene
5,000 ppm calcium stearate
2,500 ppm stearamide
1,500 ppm kaolin clay
2,000 ppm 2μ cross-linked silicone CORE LAYER—(69.5 gauge thickness)
99% by weight isotactic homopolymer polypropylene
1,000 ppm high density polyethylene
800 ppm erucamide
2,700 ppm stearamide
2,700 ppm behenamide Preferably, the cold seal release layer has a non-treated release surface, whereas the core preferably has an exposed corona-treated surface or an exposed corona-treated receptive skin layer for receiving the cold seal cohesive.

ALTERNATIVE FORMULATIONS

Alternatively, other preferred films made in accordance with the present invention may have a cold seal release layer of 2 to 10 gauge thickness, and may contain between 50% and 80% by weight Polymer (A).

According to other preferred embodiments, Polymer (B) of the cold seal release layer may contain between 20% and 50% by weight ethylene-butylene random copolymer having an ethylene content of between about 0.5% and 6.0% by weight, or a blend of such copolymer with homopolymer polybutylene.

As discussed above, another alternative embodiment of the present invention involves eliminating component (B) altogether and using as component (A) either a blend of plastomer and syndiotactic polypropylene or a blend of syndiotactic polypropylene and ethylene-propylene random copolymer. If either of these blends is used as component (A), the component may comprise up to 100% by weight of the cold seal release layer, with only minor reductions of the 100% being attributed to additives such as non-migratory slip agents.

The additive packages may alternatively and preferably contain between 1,000 and 10,000 ppm cross-linked silicone having an average particles size diameter of between 1 and 4.5 μ. The amount of kaolin clay used as an additive may vary between 0 and 10,000 ppm. Optional additives include between 0 and 10,000 ppm of each of the following: saturated and unsaturated amides having from 16 to 22 carbon atoms; zinc stearate; calcium stearate; silicone oil; glycerol monostearate; amines; and finely divided inorganic particles. High density polyethylene may also be used as a slip and/or antiblock additive at up to 3% by weight.

Optionally, the cold seal release layer can be corona discharge or flame treated but a non-treated cold seal release layer is most preferred.

Alternatives to the core layer formulation include replacing the isotactic homopolymer polypropylene discussed in the preferred formulation above with other polyolefins, such as 100% by weight polyethylene having a density in the range of from 0.91 to 0.965 gm/cm$^3$, polybutylene polymers, high crystallinity (high isotactic) polypropylene, syndiotactic polypropylene, ethylene-propylene random copolymers, ethylene-propylene block copolymers, propylene-butylene copolymers, ethylene-propylene-butylene terpolymers, and propylene polymers modified with up to about 30% by weight low molecular weight hydrocarbon tackifier. High density polyethylene can be used in the core layer in amounts ranging from 0 to 5% by weight. Optionally, small quantities of migratory additives can be included in the core layer such as amides, including erucamide, behenamide, stearamide, other $C_{16}$–$C_{22}$ saturated and unsaturated amides, and glycerol monostearate, each from 0 to 5,000 ppm, and/or amines from 0 to 1000 ppm. Other inorganics such as calcium stearate or silicone oil can also be added to the core layer, but are often more useful when used in the cold seal release layer.

The thickness of the core layer may be between the range of from about 40 to about 200 gauge, with the range of 50 to 150 gauge being more preferred for some applications. The range of 50 to 100 gauge is most preferred for many applications. The core layer is preferably corona discharge treated, flame treated, or both corona and flame treated.

EXAMPLES

Test results on various compositions for the cold seal release layer of the present invention are shown in Table I below. The polymeric blends contained no migratory slip or antiblock additives and were coextruded in a conventional (24/1 L/D) laboratory ¾" extruder equipped with a grooved feed throat and Maddox mixing section having a polyethylene-type screw. The main core layer consisted solely of isotactic homopolymer polypropylene and was extruded through a one inch extruder equipped similarly to the satellite extruder. The cold seal release skin layer comprised 5–15% by weight of the total extruded cast sheet structure. The coextruded sheet was subsequently biaxially oriented 6X by 6X on a laboratory T. M. Long film orienter.

TABLE I

Cold Seal Block Force[1] in gms/in.

| Cold Seal Film[2] Release Surface Composition (Weight %) | Kraft Singles 16 Slices/ Commercial Cold Seal | M&M/Mars Snickers/ Commercial Cold Seal | Film Film Haze % | Release Surface 45° Gloss % |
|---|---|---|---|---|
| Homopolymer-Polypropylene [PP] (100) | 120–200 | 100–230 | 1.1 | 93 |
| Ethylene (3.0%) Propylene [RCP] Random Copolymer (100) | 190 | 220 | 0.6 | 94 |
| [RCP (5.0% $C_2$)] (60) Homopolymer Polybutylene (40) | 70 | 55 | 0.3 | 94 |
| [RCP (5.0% $C_2$)] (60) Ethylene (0.5%) Butylene Random Copolymer (40) | 25–30 | 25–35 | 1.7 | 90 |
| [RCP (5.0% $C_2$)] (60) Ethylene (2.5%) Butylene Random Copolymer (40) | 35 | 25 | 0.5 | 93 |
| [RCP (5.0% $C_2$)] (60) Ethylene (5.0%) Butylene Random Copolymer (40) | 30 | 35 | 0.4 | 93 |
| Linear Low Density Polyethylene (60) Ethylene (0.5%) Butylene (40) | 30 | 20 | 8.0–39.0 | 60–26 |
| Homopolymer Polypropylene (60) Ethylene (0.5%) Butylene (40) | 30 | 35 | 1.8 | 90 |
| Syndiotactic Polypropylene (60) Ethylene (0.5%) Butylene (40) | 25 | 15 | 8.8 | 57 |
| Ethylene-Butene Plastomer Copolymer (60) Ethylene (0.5%) Butylene (40) | 35 | 40 | 29 | 25 |
| Ethylene-Butene Plastomer Copolymer (60) Syndiotactic Polypropylene (40) | 55 | 55 | 10.5 | 50 |
| Syndiotactic Polypropylene (60) Ethylene (5%) Propylene (40) Random Copolymer | 60 | 65 | 1.1 | 92 |
| High Density Polyethylene (60) Homopolymer Ethylene (0.5%) Butylene (40) Random Copolymer | 20 | 40/35 | 45–50 | 20 |

[1]Block conditions: 2 sec. moisture/ambient temp./21500 lbs. load (500 psi) 30 min./2 hrs. 40° C. conditioning with 1 lb. load.
[2]Laboratory produced, coextruded onto a base homopolymer polypropylene, then biaxially oriented 36/1 to produce a film of about 0.0075 inch thick.

The experimental films were examined for optical properties including % haze and gloss and then for cold seal release properties with commercially supplied cold seals. Table I demonstrates the high cold seal blocking tendency of polypropylene [PP] and ethylene-propylene [EP] random copolymer (ranging from 100 to 230 gms/in) when they are employed as a non-treated cold seal release surface. The cold seal release surface comprising 60 wt % ethylene-propylene random copolymer [RCP] and 40 wt % ethylene-butylene [EB] random copolymer (0.5% ethylene) shows excellent cold seal release at 25–35 gms/in. against both Kraft and Snickers cold seals. The 2.5 and 5.0 wt % $C_2$ polybutylenes demonstrated similarly excellent cold seal release when blended with the [RCP] at 40 wt %. The polybutylene homopolymer showed good but increased blocking at 70 and 55 gms/in. to the Kraft and Snickers cold seals.

Linear low density polyethylene [LLDPE], homopolymer isotactic polypropylene [PP], syndiotactic polypropylene [SYNPP] and an ethylene-butene plastomer blended with

|EB| at 60 wt % showed excellent cold seal release at 15–40 gms/in. compared to the |PP| and |RCP| surfaces alone. The |LLDPE|, |SYNPP|, and plastomer each demonstrated relatively high haze and low gloss, whereas the PP-EB showed excellent optics.

The blend of plastomer (60%) and |SYNPP| (40%), and the blend of |SYNPP| (60%) and |RCP| (40%) each provided surfaces which demonstrated good cold seal release at 60–65 gms/in. with both commercially applied cold seal cohesive. Each of these blends is expected to provide good results at weight ratios of the respective components of between about 10:90 and 90:10. The |SYNPP/RCP| blend had excellent optics as well. The |HDPE/EB| 40% blend exhibited excellent release with high haze and low gloss thus providing a matte-type surface.

The release surface compositions which contained the ethylene-butene plastomer each performed well. The plastomer is an ethylene-butylene copolymer which has been made by metallocene catalysis and contains butylene as a minor component, preferably between 8% and 27% by weight. The density of such plastomers ranges between 0.915 and 0.87 gm/cm$^3$ for the butylene content range of 8% to 27%, respectively. Ethylene-butene plastomers containing greater than 27% by weight butylene units are more commonly referred to as elastomers, and to some extent are expected to provide similarly acceptable cold seal release results when blended in accordance with the present invention. In this regard, the phrase "ethylene-butene plastomer" as used herein does not exclude ethylene-butene elastomers. Also, the terms "butylene" and "butene" as used herein are interchangeable but the term "butene" is thought to be the more common nomenclature with reference to plastomer technology.

Surprisingly, Table I additionally shows that syndiotactic polypropylene, when blended with either an ethylene-butene plastomer or an ethylene-propylene random copolymer, also provides excellent cold seal release compositions. Such good results are achieved even without the use of the low ethylene content ethylene-butylene copolymer which is used in most of the other effective compositions in accordance with the invention. It is expected that excellent cold seal release properties can be achieved according to the present invention with blends containing (A) from 1% to 80% by weight polymer selected from ethylene-based metallocene catalyzed copolymers of ethylene-butene and ethylene propylene random copolymers, and (B) from 20% to 99% by weight syndiotactic polypropylene. More preferred results may be achieved with such blends containing 40% to 60% by weight component (A) and 40% to 60% by weight component (B), with or without the addition of slip agents.

A variety of polymers were also tested to determine suitability for the cold seal receptive layer. Table II below shows the peak and average cold seal adhesions of cohesive coatings on various cold seal receptive surfaces. Any of the following polyolefin polymers can be used for the cold seal receptive surface composition and are preferably corona and/or flame treated: polyethylenes; isotactic polypropylene; syndiotactic polypropylene; butylene homopolymers; butylene copolymers with ethylene containing up to 6.0% by weight polyethylene; ethylene-propylene block copolymers; ethylene-propylene random copolymers; random copolymers containing up to 10% by weight ethylene units; high impact ethylene-propylene rubber-modified elastomers containing greater than 10% by weight ethylene units; ethylene-propylene-butylene terpolymers; ethylene-butylene copolymers made by metallocene catalysis ethylene-hexene metallocene catalyzed copolymers; ethylene-octene copolymers made by metallocene catalysis; propylene-butylene copolymers; ethylene-butylene copolymers having butylene as a minor component; and propylenes modified with low molecular weight hydrocarbon tackifiers. Examples of suitable polyethylenes are ultra low density polyethylene (ULDPE), very low density polyethylene (VLDPE), linear low density polyethylene (LLDPE), medium density polyethylene (MDPE), and high density polyethylene (HDPE), including, but not limited to, polyethylenes having densities in the range of from 0.91 to 0.965 gm/cm$^3$.

Other compositions which may be suitable for the cold seal receptive layer of the present invention include any of the foregoing or any combination thereof blended with a functionally modified polyolefin to form a polymeric composition for the cold seal receptive layer. Such functionally modified polymers include those containing: ethylene vinylacetate (EVA); ethylene methacrylic acid (EMA); terpolymers of ethylene with vinylacetate, acrylic acid and/or methacrylic acid; ethylene butylacrylate (ENBA); and maleic anhydride modified polyolefins.

TABLE II

| | COLD SEAL RECEPTIVE SURFACE (Corona treated) (all % is by weight) | COLD SEAL ADHESION (gms/inch) (Cold seal cohesive applied with #7 Meyer Rod) Peak/average |
|---|---|---|
| (1) | 100% isotactic homopolymer PP | 270/240 |
| (2) | 100% ethylene-propylene random copolymer having 3.0% ethylene | 305/280[1] |
| (3) | 100% HDPE (0.965 gms/cm$^3$) | 305/265 |
| (4) | 75% HDPE blended with 25% ethylene modified with acrylic acid and vinyl acetate | 305/265 |
| (5) | 75% HDPE blended with 25% EMA comprising 21% methacrylic acid | 310/290 |
| (6) | 75% HDPE blended with 25% EVA comprising 18% vinylacetate | 325/285 |
| (7) | 70% HDPE blended with 10% PP (with 0.6% maleic anhydride) blended with 20% acrylic acid/vinyl acetate-modified ethylene | 300/275 |
| (8) | 75% PP blended with 25% low MW tackifier comprising an alpha-methyl vinyl toluene resin | 295/295 |
| (9) | 100% PP having blended therein about 15% polycyclopentadiene | 310/285 |
| (10) | 80% PP, blended with 20% hydrocarbon resin comprising the hydrogenation product of an alpha methyl styrene | 305/290 |
| (11) | 60% HDPE blended with 40% ethylene-butylene copolymer having 0.5% ethylene units | 360/340 |
| (12) | 60% ethylene-propylene random copolymer having 3.0% ethylene units, blended with 40% ethylene-butylene copolymer having 0.5% ethylene units | 345/330 |
| (13) | 60% ethylene-propylene random copolymer having 5.0% ethylene units, blended with 40% polybutylene | 375/335 |
| (14) | 60% ethylene-propylene random copolymer having 5.0% ethylene units, blended with 40% ethylene-butylene | 380/330 |

TABLE II-continued

| COLD SEAL RECEPTIVE SURFACE (Corona treated) (all % is by weight) | | COLD SEAL ADHESION (gms/inch) (Cold seal cohesive applied with #7 Meyer Rod) Peak/average |
|---|---|---|
| | copolymer having 0.5% ethylene units | |
| (15) | 60% ethylene-propylene random copolymer having 5.0% ethylene units, blended with 40% ethylene-butylene copolymer having 2.5% ethylene units | 345/320 |
| (16) | 60% ethylene-propylene random copolymer having 5.0% ethylene units, blended with 40% ethylene-butylene copolymer having 6.0% ethylene units | 355/325 |
| (17) | 60% ethylene-butylene plastomer blended with 40% syndiotactic PP | 320/310 |
| (18) | 60% ethylene-propylene random copolymer having 50% ethylene units, blended with 40% syndiotactic PP | 320/290 |
| (19) | 60% ethylene-butylene plastomer blended with 40% ethylene-butylene copolymer having 0.5% ethylene units | 315/285 |
| (20) | 75% HDPE blended with 25% ethylene-propylene random copolymer having 3.0% ethylene units | 325/260 |
| (21) | 50% HDPE blended with 50% ethylene-propylene random copolymer having 3.0% ethylene units | 390/335 |
| (22) | 25% HDPE blended with 75% ethylene-propylene random copolymer having 3.0% ethylene units | 255/245 |
| (23) | 65% HDPE blended with 25% ethylene-propylene random copolymer having 3.0% ethylene units, and 10% low MW hydrbcarbon resin | 330/270 |
| (24) | 70% HDPE blended with 10% acrylic acid/vinyl acetate modified polyethylene and 20% zinc salt of an ethylene methacrylic acid ionomer | 345/310 |
| (25) | 70% HDPE blended with 10% PP containing 0.6% maleic anhydride groups, and blended with 20% zinc salt of ethylene methacrylic acid ionomer | 350/305 |
| (26)[2] | 100% high impact ethylene-propylene block-type copolymer | 440/350 |
| (27)[2] | 75% high impact ethylene-propylene block-type copolymer blended with 25% EVA having 18% vinylacetate | 475/390 |
| (28)[2] | 100% high impact ethylene-propylene thermoplastic heterophasic olefin copolymer | 490/430 |
| (29)[2] | 75% high impact ethylene-propylene thermoplastic heterophasic olefin copolymer blended with 25% EVA | 475/390 |
| (30)[2] | 75% high impact ethylene-propylene block copolymer having a high ethylene content blended with 25% EVA | 525/405 |
| (31)[2] | 100% ethylene-propylene random copolymer having 3.0% ethylene units (as control) | 530/455 |
| (32)[3] | 100% ethylene-octene copolymer made by metallocene catalysis comprising about 12% octene | 255/230 |
| (33)[3] | 100% ethylene-octane copolymer made by metallocene-catalysis | 240/310 |
| (34)[3] | 100% ethylene-propylene random copolymer having 3.0% ethylene units (control) | 315/275 |
| (35)[3] | 100% LLDPE (source 1) | 365/360 |
| (36)[3] | 100% LLDPE (source 2) | 425/345 |
| (37)[3] | 100% syndiotactic PP | 295/260 |

[1] acceptable product standard
[2] cohesive coating applied with a #8 Meyer Rod
[3] different cohesive than in (1)–(31), applied with # 7 Meyer Rod As can be seen from the results shown in Table II, a wide variety of cold seal receptive surface materials can be used in the packaging films of the present invention.

Although the present invention has been described in connection with preferred embodiments, it will be appreciated by those skilled in the art that additions, modifications, substitutions and deletions not specifically described may be made without departing from the spirit and scope of the invention defined in the appended claims. For example, although the packaging films of the invention have been described in terms of one, two or three layer films, it is to be understood that films having additional layers such as a metallized layer or other polymeric layers are also within the scope of the present invention.

What is claimed is:

1. A coextruded biaxially oriented polyolefin packaging film comprising a core layer, a cold seal release layer on one side of said core layer, and a cold seal receptive skin layer on an opposite side of said core layer, said cold seal release layer comprising, based on the weight of the cold seal release layer:

(A) 1% to 80% by weight of a polymer selected from the group consisting of isotactic homopolymer polypropylene, syndiotactic homopolymer polypropylene, polyethylene having a density of from 0.91 to 0.965 gm/cm$^3$, ethylene-butylene plastomers made by metallocene catalysis, ethylene-hexene plastomers made by metallocene catalysis, ethylene-octene plastomers made by metallocene catalysis, blends of at least one of said plastomers with syndiotactic homopolymer polypropylene, blends of syndiotactic homopolymer polypropylene with ethylene-propylene random copolymer, and mixtures thereof; and (B) 20% to 99% by weight of a polymer consisting of polyethylene-polybutylene copolymers containing between about 0.5% and about 6.0% by weight ethylene and between about 94% to about 99.5% by weight butylene; and optionally (C) a non-migratory slip agent present in an amount sufficient to decrease the coefficient of friction of the release layer.

said core layer comprising:

(D) a polyolefin polymer film, said cold seal receptive skin layer comprising:

(E) a polyolefin polymer film which has been surface modified to make it more receptive to a cold seal cohesive composition, and (F) a cold seal adhesive on said cold seal receptive skin layer, on a surface thereof opposite said core.

2. The film of claim 1, wherein component (A) is present in an amount of between about 25% and about 80% by weight, component (B) is present in an amount of between about 20% and about 75% by weight, and component (B) contains between about 0.5% and about 5.0% by weight ethylene and between about 95% and about 99.5% by weight butylene.

3. The film of claim 1, wherein a side of said core opposite the side having the release layer thereon has been surface modified.

4. The film of claim 1, wherein a side of said core opposite the side having the release layer thereon has been treated with at least one treatment selected from the group consisting of corona discharge treatments and flame treatments.

5. The film of claim 1, wherein component (A) is present in an amount of between about 25% and about 80% by weight, component (B) is present in an amount of between about 20% and about 75% by weight, and component (B) contains between about 0.5% and about 6.0% by weight ethylene and between about 94% and about 99.5% by weight butylene.

6. The film of claim 1, wherein component (A) is present in an amount of between about 50% and about 80% by weight and component (B) is present in an amount of between about 20% and about 50% by weight.

7. The film of claim 1, wherein said cold seal release layer comprises about 60% by weight component (A), about 40% by weight component (B), and between about 1000 ppm and about 2% by weight component (C), and said component (B) comprises an ethylene-butylene random copolymer containing from about 0.5 to about 2.5% by weight ethylene units.

8. The film of claim 1, wherein component (A) is a polyethylene selected from the group consisting of linear low density polyethylenes and high density polyethylenes.

9. The film of claim 1, wherein component (C) is present and comprises up to about 2% by weight, based on the total weight of the cold seal release layer, of at least one member selected from the group consisting of high density polyethylene, crosslinked silicone particles having an average particle size of between about 1 and about 4.5 microns, inorganic finely divided clay, talc, diatomaceous earth, silicas, saturated and unsaturated amides containing from 16 to 22 carbon atoms, zinc stearate, calcium stearate, silicone oil, glycerol monostearate and amines.

10. The film of claim 1, wherein component (C) is present and comprises between about 1,000 and about 10,000 ppm crosslinked silicone particles having an average particle size of between about 1 and about 4.5 microns.

11. The film of claim 1, wherein said cold seal release layer has a layer thickness of between about 2 and about 10 gauge, and said core layer has a thickness between about 40 and 150 gauge.

12. The film of claim 1, wherein said core layer comprises at least one member selected from the group consisting of isotactic homopolymer polypropylene, ethylene-propylene random copolymers, ethylene-propylene block copolymers, polyethylenes having densities of from 0.91 to 0.965 gm/cm$^3$, and mixtures thereof.

13. The film of claim 1, wherein said core layer comprises isotactic homopolymer polypropylene.

14. The film of claim 1, wherein said core layer consists of isotactic homopolymer polypropylene.

15. The film of claim 1, wherein said core layer further comprises at least one additive selected from the group consisting of $C_{16}$–$C_{22}$ saturated and unsaturated amides and glycerol monostearate in an amount of up to about 5,000 ppm per additive based on the weight of said core layer; and amines in an amount of up to about 1,000 ppm.

16. The film of claims 1, wherein said cold seal receptive skin layer has been treated with at least one treatment selected from the group consisting of corona discharge treatments and flame treatments.

17. The film of claim 1, wherein said cohesive is a cold seal latex cohesive.

18. The film of claim 1, wherein said cohesive is applied to said cold seal receptive skin layer in a pattern.

19. The film of claim 1, wherein said cold seal receptive skin layer has a thickness of from 1 to 10 gauge and is fabricated of a functionally modified polymer.

20. The film of claim 11 wherein component
(A) comprises 1% to 80% by weight of a polymer selected from the group consisting of ethyl-butene plastomers made by metallocene catalysis, and ethylene-propylene random copolymers; and component
(B) comprises 20% to 99% by weight of syndiotactic polypropylene;.

21. The film as in claim 20, comprising between about 40% and about 60% by weight component (A) and between about 40% and about 60% by weight component (B).

* * * * *